United States Patent
Park

(10) Patent No.: US 10,198,118 B2
(45) Date of Patent: Feb. 5, 2019

(54) OPERATING METHOD AND ELECTRONIC DEVICE FOR PROCESSING METHOD THEREOF

(71) Applicant: Samsung Electronics Co., Ltd., Gyeonggi-do (KR)

(72) Inventor: Hyung-Jin Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 14/566,527

(22) Filed: Dec. 10, 2014

(65) Prior Publication Data

US 2015/0160780 A1 Jun. 11, 2015

(30) Foreign Application Priority Data

Dec. 10, 2013 (KR) .................. 10-2013-0153449

(51) Int. Cl.
*G06F 3/044* (2006.01)
*G06F 3/041* (2006.01)
*G06F 3/0488* (2013.01)

(52) U.S. Cl.
CPC .......... *G06F 3/0418* (2013.01); *G06F 3/0488* (2013.01); *G06F 2203/04106* (2013.01)

(58) Field of Classification Search
CPC ............................. G06F 3/0488; G06F 3/0418
USPC .................................................. 345/173–174
See application file for complete search history.

(56) References Cited

U.S. PATENT DOCUMENTS

| | | | | |
|---|---|---|---|---|
| 8,136,053 B1* | 3/2012 | Miller | ............... | G06F 3/04883 345/156 |
| 2009/0160784 A1* | 6/2009 | Ishida | ............... | G06F 1/1616 345/173 |
| 2009/0262078 A1* | 10/2009 | Pizzi | ............... | G06F 1/1626 345/169 |
| 2010/0177037 A1 | 7/2010 | Kim et al. | | |
| 2012/0060261 A1 | 3/2012 | Raviv | | |
| 2012/0071149 A1* | 3/2012 | Bandyopadhyay | ... | G06F 1/1643 455/418 |
| 2012/0071151 A1* | 3/2012 | Abramson | ............... | H04L 67/12 455/418 |
| 2012/0185999 A1 | 7/2012 | Raviv | | |
| 2012/0186000 A1 | 7/2012 | Raviv | | |
| 2012/0262407 A1* | 10/2012 | Hinckley | ............... | G06F 3/038 345/173 |
| 2012/0280917 A1* | 11/2012 | Toksvig | ............... | G06F 1/1626 345/173 |
| 2013/0082939 A1* | 4/2013 | Zhao | ............... | G06F 1/3218 345/173 |
| 2013/0314365 A1* | 11/2013 | Woolley | ............... | G06F 3/044 345/174 |

FOREIGN PATENT DOCUMENTS

KR 10-2010-0082552 7/2010

* cited by examiner

*Primary Examiner* — Kwin Xie

(57) ABSTRACT

An apparatus and a method are provided for controlling an operation of an electronic device. The electronic device includes a touchscreen and a processor. The processor may be configured to determine a pocket reception state based on a touch movement direction and a movement direction of the electronic device. The processor can also process an operation corresponding to the pocket reception state.

17 Claims, 10 Drawing Sheets

OPERATING METHOD AND ELECTRONIC DEVICE FOR PROCESSING METHOD THEREOF

PRIORITY

The present application is related to and claims the benefit under 35 U.S.C. § 119(a) of a Korean patent application filed in the Korean Intellectual Property Office on Dec. 10, 2013, and assigned Serial No. 10-2013-0153449, the entire disclosure of which is hereby incorporated by reference.

TECHNICAL FIELD

The present disclosure relates to an electronic device. More particularly, the present disclosure relates to an apparatus and a method for controlling an operation of an electronic device.

BACKGROUND

Recently, as an electronic device develops rapidly, an electronic device that may exchange information or data is used variously. Generally, this electronic device has a display means and an input means, and may detect an input for the input means to perform an operation corresponding to the input. For example, the electronic device may have a touchscreen performing an input and display using one screen, and may detect an input that uses a stylus pen, an electronic pen, a finger, a voice instruction, or a gesture, and the like to perform an operation of text output, application execution, or a touch lock function, and the like.

The touch lock function may be a function for inactivating an operation of a touch panel to prevent a touch malfunction.

SUMMARY

To address the above-discussed deficiencies, it is a primary object to provide an apparatus and a method for preventing a touch malfunction in an electronic device.

Another aspect of the present disclosure is to provide an apparatus and a method for determining a pocket reception state in an electronic device.

Still another aspect of the present disclosure is to provide an apparatus and a method for performing an operation corresponding to a pocket reception state in an electronic device.

Yet another aspect of the present disclosure is to provide an apparatus and a method for stopping an operation for an input means or a display means in a pocket reception state in an electronic device.

In accordance with an aspect of the present disclosure, an electronic device is provided. The electronic device includes a touchscreen and a processor. The processor is configured to determine a pocket reception state based on a touch movement direction and a movement direction of the electronic device. The processor is also configured to process an operation corresponding to the pocket reception state.

In accordance with another aspect of the present disclosure, a method for operating an electronic device is provided. The method includes determining at least one of a touch input state and circumstance information with a touch lock function inactivated. The method also includes determining an operation mode of the electronic device in response to at least one of the touch input state and the circumstance information.

In accordance with still another aspect of the present disclosure, a computer-readable recording medium is provided. The computer-readable recording medium including a program recorded thereon, for executing an operation of determining a pocket reception state based on a touch movement direction and a movement direction of an electronic device. The program is also for an operation corresponding to the pocket reception state.

Other aspects, advantages and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
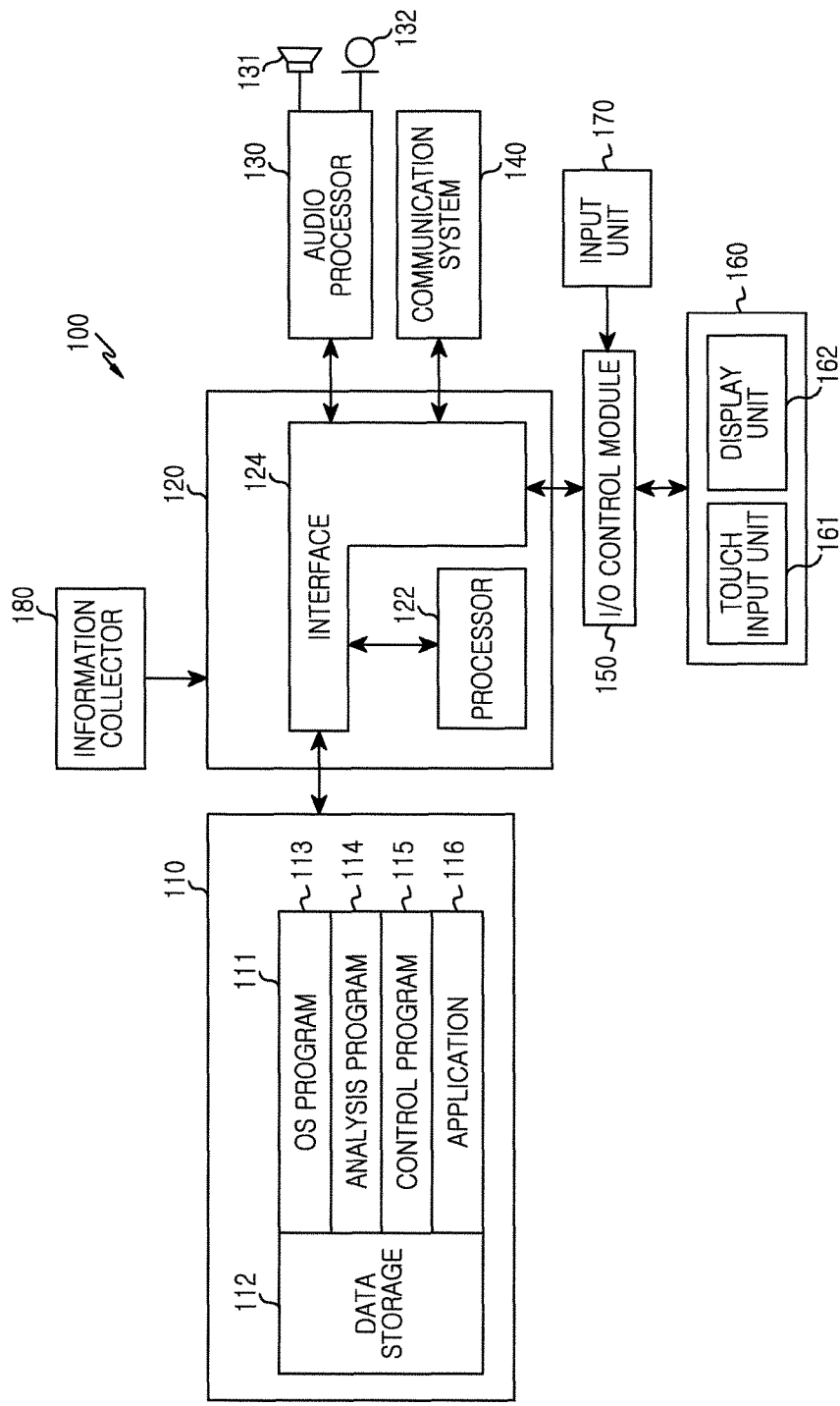
FIG. 1 illustrates a block diagram showing a construction of an electronic device according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, the present disclosure may be described with reference to the accompanying drawings. Though specific embodiments of the present disclosure have been exemplarily illustrated in the drawings and related detailed description has been made, various modifications may be made and various embodiments may be provided. It should be understood that the present disclosure is not intended for limiting the disclosure to a specific embodiment form but includes all modifications or equivalents or replacements thereof included in the spirit and the technical range of the present disclosure. In the drawing, like reference numerals are used for like elements.

Recently, as an electronic device develops rapidly, an electronic device that may exchange information or data is used variously. A touchscreen variously used for the electronic device may allow a user to perform input and display of information via one screen. An electronic device having this touchscreen may add text, a number, or a figure, and the like on displayed contents, or execute a specific function using an input means, for example, a finger, a stylus pen, or an electronic pen. The electronic device may detect a direct or indirect touch input for a touchscreen. The indirect touch input may include a glove touch input, a proximity touch input, or a cover touch input, and the like. According to an embodiment, the glove touch input may be inputting data on a touchscreen while a user wears leather, clothing (for example, gloves) such as cloth, and the like having conductivity. The proximity touch input may be inputting while a user is distant from a touchscreen by a predetermined distance. The cover touch input may be an input for an input region of a cover also having a display protect function, installed to an electronic device.

The electronic device may store a reference sensitivity for each input means or an input mode, and determine a touch input mode based on the reference sensitivity and sensitivity for an input. For example, when determining input sensitivity corresponding to reference sensitivity of a glove touch input mode, the electronic device may determine that the glove touch input mode is performed.

When the electronic device rubs against a pocket cloth of a human body side while the electronic device is received into a pocket, a circumstance where the glove touch input mode is recognized may occur.

The electronic device may execute a touch lock function in order to prevent a touch malfunction. For example, the electronic device may not process an input for a touchscreen by inactivating an operation of a touch panel. The electronic device may detect an input of a hardware button or a software button to execute a touch lock function.

According to the present disclosure, when the electronic device is received in a pocket with the touch lock function not executed, the electronic device may prevent a touch malfunction.

The electronic device may determine a pocket reception state based on at least one of a touch input state and circumstance information. For example, the electronic device may recognize friction of a pocket material (for example, leather, cloth, and the like) contacting a human body as a glove touch. When a glove touch moves by an area of a threshold defined in advance, it may be determined that the electronic device is received in the pocket. The electronic device received in the pocket may move in a direction opposite to a touch movement direction. When detecting a touch movement opposite to a movement direction, the electronic device may determine that it is in a pocket reception state. The electronic device may detect a movement direction and movement of the electronic device using a sensor (for example, an acceleration sensor, a gyro sensor, and the like) capable of detecting movement and direction.

For another example, the electronic device may determine the pocket reception state using circumstance information such as neighboring noise, ambient brightness, and the like. The electronic device received in a pocket may measure brightness corresponding to darkness and noise corresponding to tranquility. The electronic device may determine may determine a pocket reception state by determining a circumstance of moving from a bright place to a dark place, and a circumstance of moving from a nosy place to a noise-free place. The electronic device may detect circumstance information using a proximity sensor, an illuminance sensor, a sound sensor, and the like.

An electronic device according to the present disclosure may be a device including a communication function. For example, the electronic device may be one of various devices such as a smartphone, a tablet Personal Computer (PC), a mobile phone, a video telephone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, and the like, or a combination thereof. It is obvious to a person of ordinary skill in the art that the electronic device according to the present disclosure is not limited to the above-described devices.

FIG. 1 illustrates a construction of an electronic device according to various embodiments of the present disclosure.

Referring to FIG. 1, the electronic device 100 may include a memory 110, a processor unit 120, an audio processor 130, a communication system 140, an input/output (I/O) control module 150, a touchscreen 160, an input unit 170, or an information collector 180. At least one of these elements may exist in the plural. Each element is described below.

The memory 110 may include program storage 111 for storing a program for controlling an operation of the electronic device 100, or a data storage 112 for storing data occurring during execution of a program. For example, the data storage 112 may store various updatable data for storage such as a phonebook, calling messages, or received messages, and store data for determining a pocket reception state according to the present embodiment. For example, the data storage 112 may store reference information regarding a touch input state, circumstance information, and the like serving as a reference for determining a pocket reception state, information regarding a function controlled during the pocket reception state, and the like. According to an embodiment, the touch input state information may include a threshold for reference sensitivity, a reference area, a touch direction, an input maintain time, and the like for recognizing friction of a pocket material as a touch input. Reference information for the circumstance information may include a threshold for brightness, noise, movement, and the like.

The program storage 111 may include an Operating System (OS) program 113, an analysis program 114, a control program 115, or at least one application 116. Here, a program included in the program storage 111 is a set of instructions, and may be expressed as an instruction set.

The OS program 113 may include various software elements for controlling a general system operation. Control of this general system operation may mean, for example, memory management or control, storage hardware (device) control or management, power control or management, and the like. The OS program 115 may perform a function for swift communication between various hardware (devices) and program elements (modules).

The analysis program 114 may include various software elements for determining a pocket reception state for the electronic device 100. The analysis program 114 may determine a pocket reception state based on one of a touch input state and circumstance information for the electronic device 100. For example, the analysis program 114 may detect a touch input that uses an input means such as a finger, an electronic pen, and the like, a glove touch input, or a proximity touch input, and the like, and analyze sensitivity for the touch input to determine a touch input mode. According to an embodiment, the analysis program 114 may recognize friction of a pocket material as the glove touch input, and determine a pocket reception state based on a glove touch movement direction and movement of the electronic device 100.

The analysis program 114 may determine circumstance information such as neighboring noise, ambient brightness, and the like in order to determine a pocket reception state. For example, the analysis program 114 may measure brightness corresponding to darkness and noise corresponding to tranquility with the electronic device received in the pocket. According to an embodiment, the analysis program 114 may determine a pocket reception state by determining a circumstance of moving from a bright place to a dark place, and a circumstance of moving from a nosy place to a noise-free place.

The control program 115 may include various software elements for changing setting of the electronic device 100 in a pocket reception state.

For example, when determining a pocket reception state, the control program 115 may inactivate an unnecessary function in the pocket reception state or activate a necessary function in the pocket reception state. According to an embodiment, the control program 115 may perform a pocket mode that inactivates a wireless LAN function, a wireless charging function, a bell sound function or a camera function, a display function or a touch detect function, and the like, and activates a vibration function, a Bluetooth function, a function that may measure a user's movement (for example, a passometer function, a movement distance measuring function, a movement path tracing function, or a calorie calculate function, and the like), and the like.

According to another embodiment, the control program 115 may perform a pocket mode that adjusts transmission power to reduce a specific absorption rate (SAR) influencing a human body.

The application 116 may include a software element for at least one application installed to the electronic device 100, and also include a program determining a pocket reception state and controlling an operation of the electronic device 100 as described above. For example, the application 116 may include an application controlling a pocket reception mode.

At least one program stored in the program storage 111 may be hardware configuration. For example, the electronic device 100 may include an OS module, an analysis module, a control module, and the like.

The program storage 111 may include a display program. The display program may include various software elements for providing and displaying graphics on the touchscreen 160. A terminology of graphics may be used as meaning including text, a web page, an icon, a digital image, video, animation, and the like.

The display program may include various software elements related to a user interface.

The display program may output an operation setting a function controlled in a pocket mode.

The processor unit 120 may include at least one processor 122 or an interface 124. Here, the processor 122 or the interface 124 may be integrated in at least one integrated circuit or implemented as a separate element.

The interface 124 may perform a role of a memory interface controlling an access of the processor 122 to the memory 110. The interface 124 may perform a role of a peripheral interface controlling connection of an I/O peripheral of the electronic device 100 and the processor 122.

The processor 122 may control to determine whether the electronic device 100 is in a pocket reception state, and perform an operation of a pocket mode using at least one software program.

The audio processor 130 may provide an audio interface between a user and the electronic device 100 via a speaker 131 or a microphone 132.

The communication system 140 may perform a communication function for voice communication or data communication of the electronic device 100. At this point, the communication system 140 may be divided into a plurality of communication sub modules supporting different communication networks. For example, though not limited thereto, the communication network may include a Global System for Mobile Communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, or a wireless LAN, a short distance network such as a Bluetooth network or a Near Field Communication (NFC), and the like.

The I/O control module 150 may provide an interface between an I/O unit such as the touchscreen 160 or the input unit 170, and the interface.

The touchscreen 160 is an I/O unit performing output of information or input of information, and may include a touch input unit 161 and a display unit 162.

The touch input unit 161 may provide touch information detected via a touch panel to the processor unit 120 via the control module 150. At this point, the touch input unit 161 changes touch information to an instruction structure such as touchdown, touch move, or touchup to provide the same to the processor unit 122, and may generate an input for determining the pocket reception state.

The display unit 162 may display state information of the electronic device, a character input by a user, a moving picture or a still picture, and the like. For example, the display unit 162 may output an AP connection operation. For example, the display unit 162 may output a function setting operation controlled during a pocket mode.

The input unit 170 may provide input data generated by a user's selection to the processor unit 122 via the I/O control module 150. For example, the input unit 170 may include only a control button for controlling the electronic device 100. For another example, the input unit 170 may be configured using a keypad for receiving input data from a user, and may generate an input for setting of a function controlled during the pocket mode.

The information collector 180 may include a sensor for determining movement of the electronic device 100, and circumstance information of the electronic device 100. According to an embodiment, the information collector 180 may include an acceleration sensor, a gyro sensor, and the like that may detect movement and direction, and a proximity sensor, an illuminance sensor, a sound sensor, and the like that may detect circumstance information such as neighboring noise, ambient brightness, and the like.

Though not shown, the electronic device 100 may further include elements for providing additional functions such as a broadcasting receiving module for receiving broadcasting, a digital sound source recovery module such as an MP3 module, an image sensor for obtaining image data, and the like, and a software for operation of these.

According to various embodiments, the electronic device may include a touchscreen and a processor. According to various embodiments, the processor may be configured to determine a pocket reception state based on touch movement direction and movement direction of the electronic device, and process an operation corresponding to the pocket reception state.

According to various embodiments, the electronic device may further include a memory for storing reference data for determining a pocket reception state. According to various embodiments, the processor may be configured to determine a touch movement direction based on the reference data and touch input sensitivity.

According to various embodiments, the processor may be configured to detect a touch input generated by a pocket contacting a human body.

According to various embodiments, the processor may be configured to perform at least one of an operation of inactivating at least one of functions of the electronic device under a pocket reception state, an operation of adjusting transmission power to reduce an SAR, an operation of activating a function that may measure a user's movement, and an operation of performing a communication scheme change mode in response to a pocket reception state.

According to various embodiments, when detecting movement of the electronic device for a time defined in advance after determining the pocket reception state, the processor may be configured to activate a function that may measure the user's movement.

According to various embodiments, the processor may be configured to determine the pocket reception state and then activate a function that may measure the user's movement based on information regarding a movement means.

According to various embodiments, the processor may be configured to inactivate an operation regarding a touch panel.

According to various embodiments, the electronic device may further include a sensor that may determine at least one of ambient brightness and noise. According to various embodiments, the processor may be configured to use at least one of the ambient brightness and noise together with the touch movement direction and movement direction of the electronic device in determining a pocket reception state.

According to various embodiments, when the touch movement direction and the movement direction of the electronic device are opposite to each other, the processor may be configured to determine the electronic device is in the pocket reception state.

Figure 2:
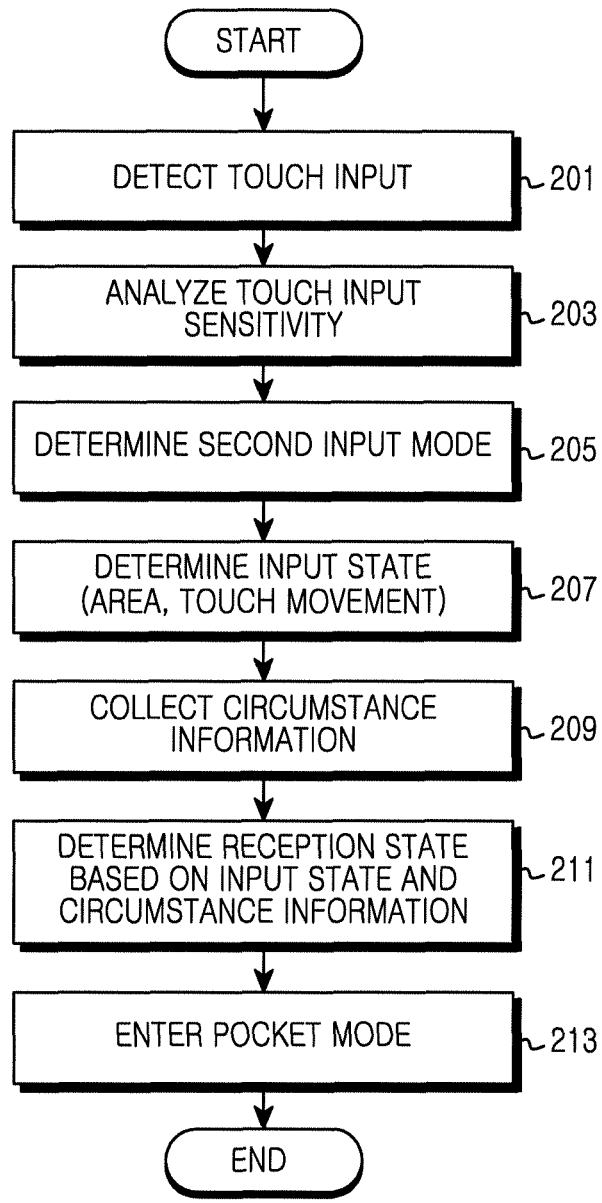
FIG. 2 illustrates an operation of an electronic device according to an embodiment.

FIG. 2 illustrates an operation of an electronic device according to an embodiment.

Referring to FIG. 2, the electronic device may control an operation of the electronic device in response to at least one of a touch input state and circumstance information. For example, the electronic device may determine a pocket reception state in response to the touch input state or circumstance information. When determining the pocket reception state, the electronic device may operate as a pocket mode that allows changing to setting defined in advance. According to an embodiment, the electronic device that operates as the pocket mode may inactivate an unnecessary function under a pocket reception state, or activate a function necessary in the pocket reception state, for example, a vibration function, a Bluetooth function, and the like.

The electronic device may detect a touch input in operation 201. For example, the electronic device may detect a touch input that uses an input means such as a finger, an electronic pen, and the like, a glove touch input, or a proximity touch input, and the like.

The electronic device may analyze touch input sensitivity in operation 203. The touch input sensitivity may include a capacitance value measured by a touch input for the touchscreen or a capacitance value changed by a touch input.

The electronic device may determine a second input mode in operation 205. The second input mode is an indirect touch input for the touchscreen, and may include an input mode that detects a glove touch input, a proximity touch input, or a cover touch input, and the like. The glove touch input may be inputting data on a touchscreen while a user wears gloves of leather, cloth, and the like. The proximity touch input may be inputting while a user is distant from a touchscreen by a predetermined distance. In addition, the cover touch input may be an input for an input region of a cover also having a display protect function, installed to an electronic device.

According to the present embodiment, the electronic device may store reference sensitivity corresponding to each touch input mode, and determine a touch input mode based on the reference sensitivity and input sensitivity. For example, when determining input sensitivity corresponding to reference sensitivity of a glove touch input mode, the electronic device may determine the glove touch input mode is performed.

The electronic device may determine a touch input state in operation 207. The electronic device may determine a touch input state such as a touch area, a touch movement, or a touch maintain time, and the like in the second input mode state. According to an embodiment, the electronic device may determine whether a touch input for an area of a threshold or more defined in advance is detected and whether a touch movement is detected while the touch input has been detected.

The electronic device may collect circumstance information in operation 209. The electronic device may collect circumstance information, for example, neighboring noise, ambient brightness, or movement of the electronic device, and the like in order to determine a circumstance where the electronic device is received in a pocket.

The electronic device may determine a pocket reception state based on at least one of a touch input state and circumstance information in operation 211. Here, the pocket reception state may be a state where the electronic device is received into a pocket attached to clothing, a bag, and the like, and a portion of the pocket may contact a portion of a human body.

In addition, while received in a pocket, the electronic device may maintain an angle of a threshold or more. According to an embodiment, the electronic device may determine a posture of the electronic device in order to determine a pocket reception state. For example, when maintaining a predetermined angle with respect to a horizontal plane, the electronic device may determine that the electronic device is in a vertical state, and use this in determining a pocket reception state.

When the electronic device determines a pocket reception state in operation 213, the electronic device may operate in a pocket mode. Here, the pocket mode may be a mode that activates an operation defined in advance that may be operated by the electronic device under the pocket reception state. The electronic device may store in advance information regarding an activated function or an inactivated function in the pocket mode. According to an embodiment, when operating in the pocket mode, the electronic device may inactivate an unnecessary function under the pocket reception state, for example, a wireless LAN function, a wireless charging function, a bell sound function or a camera function, a display function or a touch detect function, and the like.

According to another embodiment, when operating in the pocket mode, the electronic device may adjust transmission power to reduce an SAR influencing a human body. For example, when operating in the pocket mode while outputting transmission power using a default output value, the electronic device may power back-off transmission power using a transmission power value set in advance, and output the same. According to an embodiment, the electronic device may generally output a default value corresponding to 23~29.5 dBm when the electronic device operates in a non-pocket mode, and output an output value powered back-off to 18~22.5 dBm when the electronic device operates in the pocket mode.

According to another embodiment, when operating in the pocket mode, the electronic device may activate a necessary function under the pocket state, for example, a vibration function, a Bluetooth function, and the like, or activate a function that may measure a user's movement, for example, a passometer function, a movement distance measuring function, a movement path tracing function, or a calorie calculate function, and the like.

As described above, the electronic device according to the present embodiment may determine a state in which the electronic device has been received in a pocket based on a touch input state by a user. For example, when a touch input for an area of a threshold or more, and a touch movement with the input maintained is detected, the electronic device may determine that the electronic device is received into the pocket.

According to another embodiment, the electronic device may determine a state in which the electronic device has been received in a pocket based on the circumstance information. For example, when detecting illuminance getting dark while the electronic device gripped with a hand, the electronic device may determine a circumstance where it is received into the pocket.

According to still another embodiment, the electronic device may determine a state in which the electronic device has been received in a pocket based on the touch input state and the circumstance information. For example, when detecting illuminance getting dark, simultaneously with detecting a touch input for an area of a threshold or more, and a touch movement with the input maintained, the electronic device may determine a circumstance where it is received into the pocket.

Figure 3:
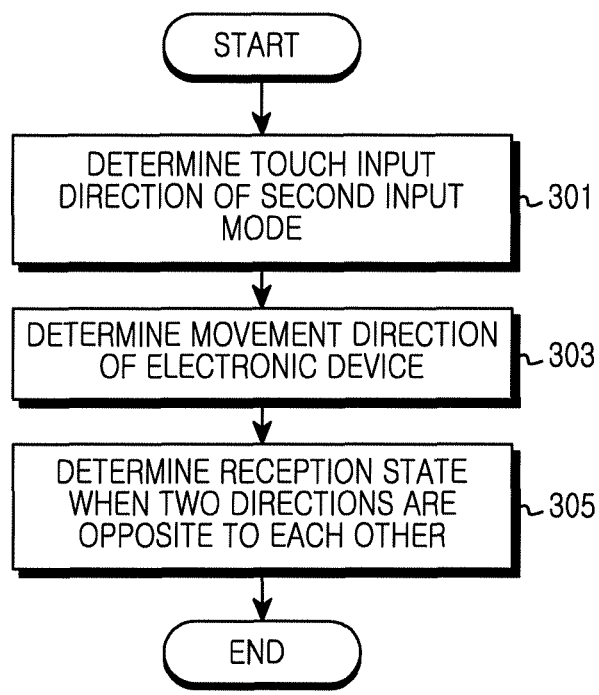
FIG. 3 illustrates an operation of determining a pocket reception state of an electronic device according to an embodiment.

FIG. 3 illustrates an operation of determining a pocket reception state of an electronic device according to an embodiment.

Referring to FIG. 3, the electronic device may determine a pocket reception state based on a touch input state.

The electronic device may determine a touch input direction of the second input mode in operation 301. Here, the second input mode may be a mode that detects an indirect input for a touchscreen such as a glove touch input, a proximity touch input, or a cover touch input, and the like.

The electronic device may determine a movement direction of the electronic device in operation 303. The electronic device may determine the movement direction in order to determine a circumstance where the electronic device moves into a pocket.

The electronic device may determine a pocket reception state based on a touch input direction and a movement direction in operation 305. For example, a circumstance where the electronic device is received into a pocket while a touch plane of the electronic device contacts a human body may occur. The electronic device may determine a touch of a pocket material with a human body as a glove touch input. When the electronic device moves into a pocket while it contacts a human body, the electronic device may determine a glove touch movement.

In the electronic device that moves into the pocket while it contacts the human body, a touch movement direction and a movement direction of the electronic device may be opposite to each other. For example, when the electronic device moves to a lower portion of the pocket, it may be detected that a touch point by the body contact moves to the upper side of the electronic device.

When the touch movement direction and the movement direction of the electronic device are opposite to each other, the electronic device may determine that the electronic device has been received in the pocket.

Figure 4:
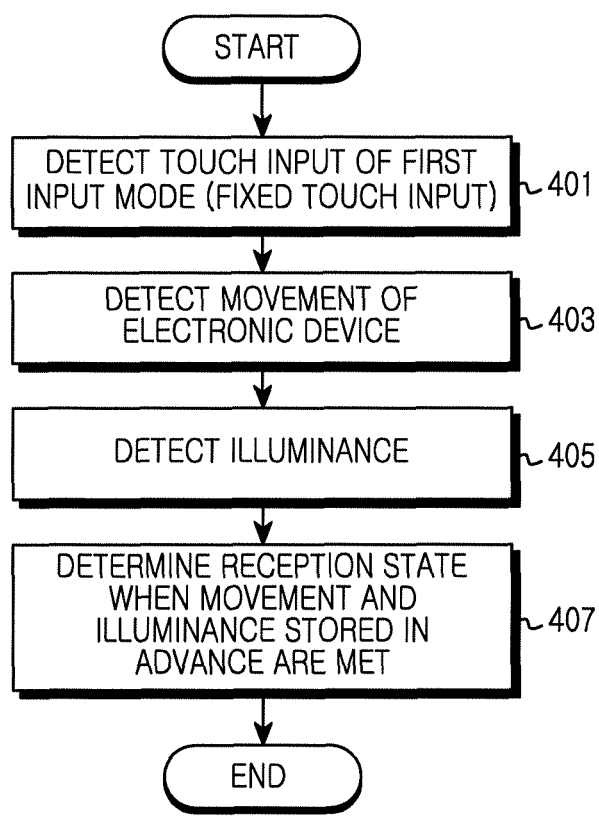
FIG. 4 illustrates an operation of determining a pocket reception state of an electronic device according to an embodiment.

FIG. 4 illustrates an operation of determining a pocket reception state of an electronic device according to an embodiment.

Referring to FIG. 4, the electronic device may determine a pocket reception state based on a touch input state and circumstance information.

The electronic device may determine a touch input direction of a first input mode in operation 401. Here, the first input mode may be a mode where a user performs a direct touch input on a touchscreen. According to an embodiment, the first input mode may be a mode where a user performs an input on at least a portion of the touchscreen with his finger or palm. A circumstance where a touch input of the first input mode has occurred may include a state where a user grips the touchscreen with his finger or palm.

The electronic device may detect movement of the electronic device in operation 403.

The electronic device may detect illuminance in operation 405. For example, the electronic device may determine ambient brightness corresponding to a predetermined reference.

The electronic device may determine a pocket reception state based on movement and illuminance in operation 407. For example, a circumstance where the electronic device is received into a pocket while a touch plane of the electronic device contacts a human body may occur. When determining illuminance corresponding to a condition defined in advance, the electronic device may determine the electronic device has been received in a pocket.

In the electronic device that moves into the pocket while it contacts the human body, a touch movement direction and a movement direction of the electronic device may be opposite to each other. For example, when the electronic device moves to a lower portion of the pocket, it may be detected that a touch point by the body contact moves to the upper side of the electronic device.

When the touch movement direction and the movement direction of the electronic device are opposite to each other, the electronic device may determine that the electronic device has been received in the pocket.

Figure 5C:
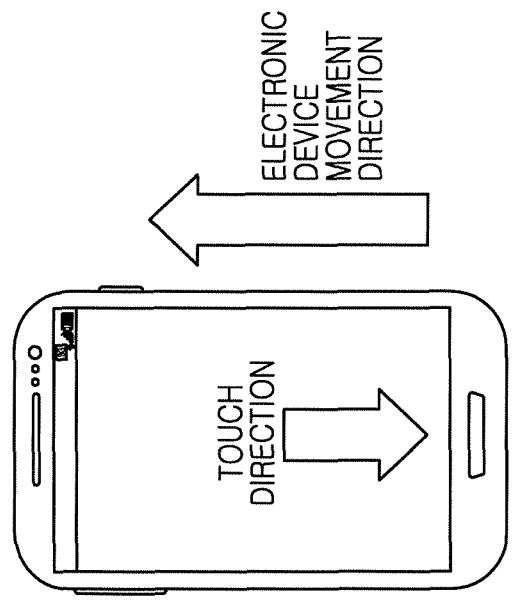
FIGS. 5A-5C illustrate an operation of determining a pocket reception state according to various embodiments of the present disclosure.
Figure 5B:
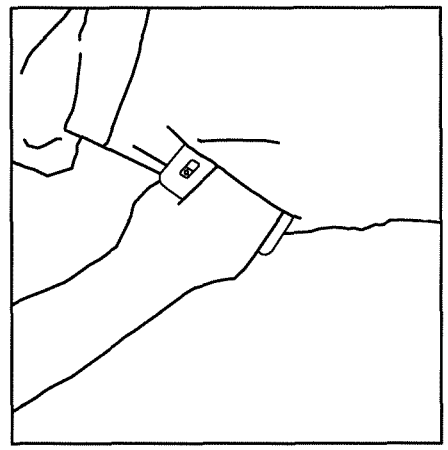
Figure 5A:
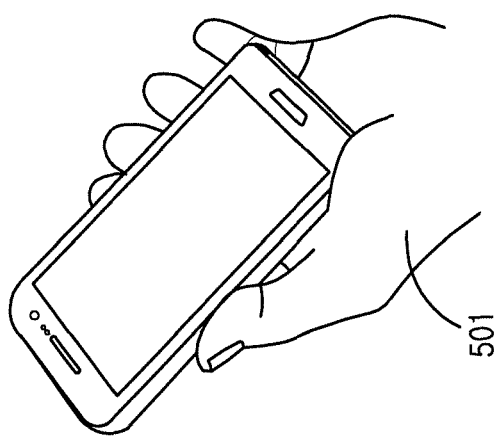

FIGS. 5A-5C illustrate an operation of determining a pocket reception state according to various embodiments of the present disclosure.

Referring to FIG. 5, an electronic device having portability may be easily gripped by a user. A touchscreen of the electronic device may be disposed on its front side and a battery cover may be disposed on its backside. A position of the touchscreen may change depending on a gripping method. For example, the electronic device may be gripped such that the backside of the electronic device faces a user's palm, or the front side of the electronic device faces the user's palm.

The electronic device may provide a touch lock function that inactivates a touch panel operation. The electronic device may detect an input for the touchscreen with the touch lock function inactivated. When a user receives the electronic device in a pocket with a lock function inactivated, a touchscreen of the electronic device may contact the user's body, which may be recognized as a touch input (for example, a glove touch input). For example, when the electronic device is received according to FIG. 5B while the backside of the electronic device faces (501) the user's palm as illustrated in FIG. 5A, the electronic device may be received in the pocket while the touchscreen on the front side is exposed and contacts the user's body.

It may be determined that the electronic device in a state where it is received in the pocket while contacting the user's body moves in a first direction (for example, a pocket inside direction) and a touch input by the user's body moves in a second direction opposite to the first direction.

The electronic device may determine it is received in a pocket based on movement and a touch movement direction, for example, when the electronic device moves in a direction opposite to a touch movement direction as illustrated in FIG. 5C.

Figure 6C:
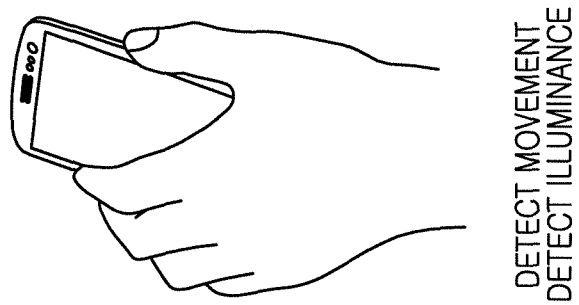
FIGS. 6A-6C illustrate an operation of determining a pocket reception state according to various embodiments of the present disclosure.
Figure 6B:
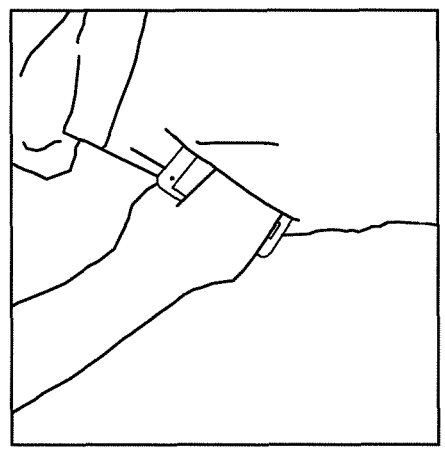
Figure 6A:

FIGS. 6A-6C illustrate an operation of determining a pocket reception state according to various embodiments of the present disclosure.

Referring to FIG. 6, when a user receives the electronic device in a pocket with a lock function inactivated, a touchscreen of the electronic device contacts the user's body, which may be recognized as a touch input. For example, when the electronic device is received according to FIG. 6B while the front side of the electronic device faces (601) the user's palm as illustrated in FIG. 6A, the electronic device may be received in the pocket while the touchscreen on the front side contacts the user's palm.

In this embodiment, the electronic device may move in a first direction with a touch input detected.

The electronic device may determine a pocket reception state based on movement of the state where the touch input has been detected. The electronic device may determine a pocket reception state based on movement and illuminance information. According to an embodiment, when brightness defined in advance is detected during movement with a touch input detected, the electronic device may determine that the electronic device is received in a pocket.

Figure 7:
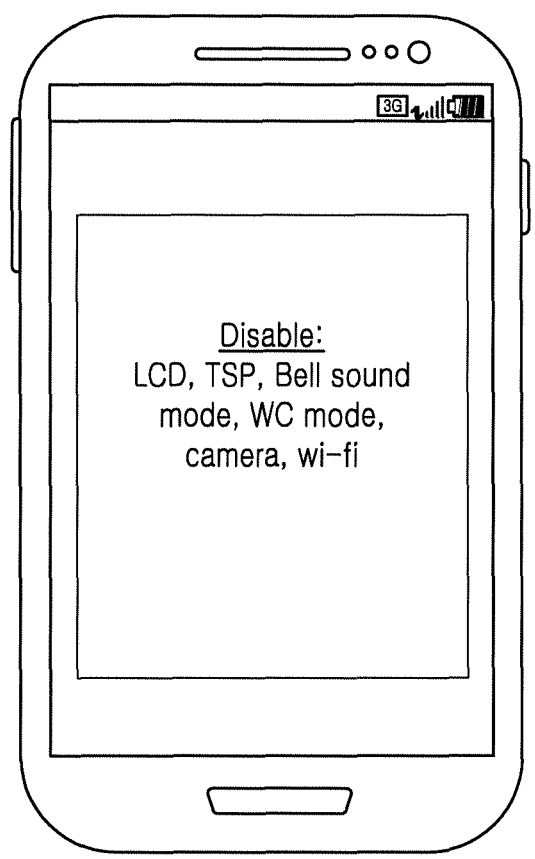
FIG. 7 illustrates an operation of a pocket mode according to various embodiments of the present disclosure.

FIG. 7 illustrates an operation of a pocket mode according to various embodiments of the present disclosure.

Referring to FIG. 7, the electronic device may determine a pocket reception state in response to at least one of a touch input state and circumstance information. According to an embodiment, the touch input state may include a touch area or a touch movement under a second input mode, and the circumstance information may include neighboring noise, ambient brightness, or movement of the electronic device, and the like. According to an embodiment, the second input mode is a mode where a user performs an indirect touch input on the touchscreen, and may include a glove touch input. When detecting a second touch input moving in a direction opposite to a movement direction of the electronic device, the electronic device may determine the pocket reception state.

When determining the pocket reception state, the electronic device may operate as a pocket mode that allows to perform a function defined in advance, corresponding to the pocket reception state. For example, the electronic device that operates in the pocket mode may inactivate an unnecessary function under the pocket reception state. According to an embodiment, when operating in the pocket mode as illustrated, the electronic device may inactivate an LCD, a TSP, a bell sound function, a Wireless Charging (WC) function, a camera function, and the like.

Figure 8A:
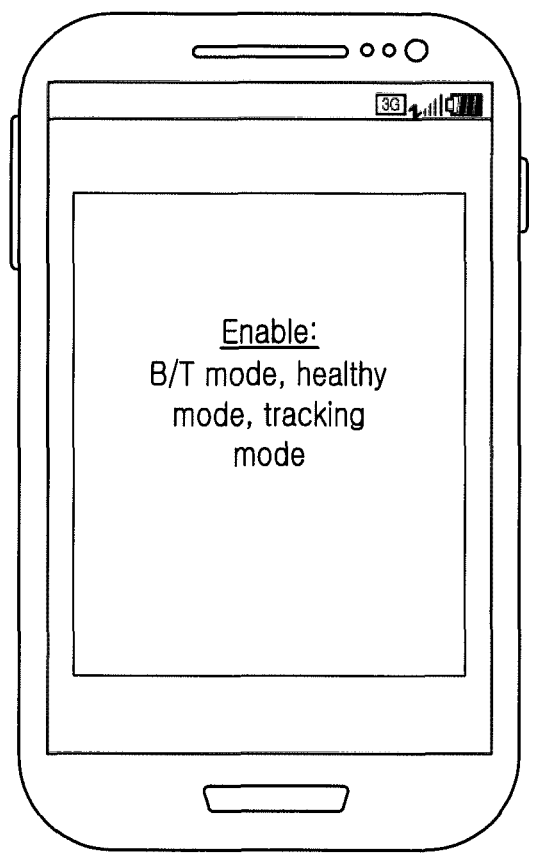
FIGS. 8A and 8B illustrate an operation of a pocket mode according to various embodiments of the present disclosure.
Figure 8B:
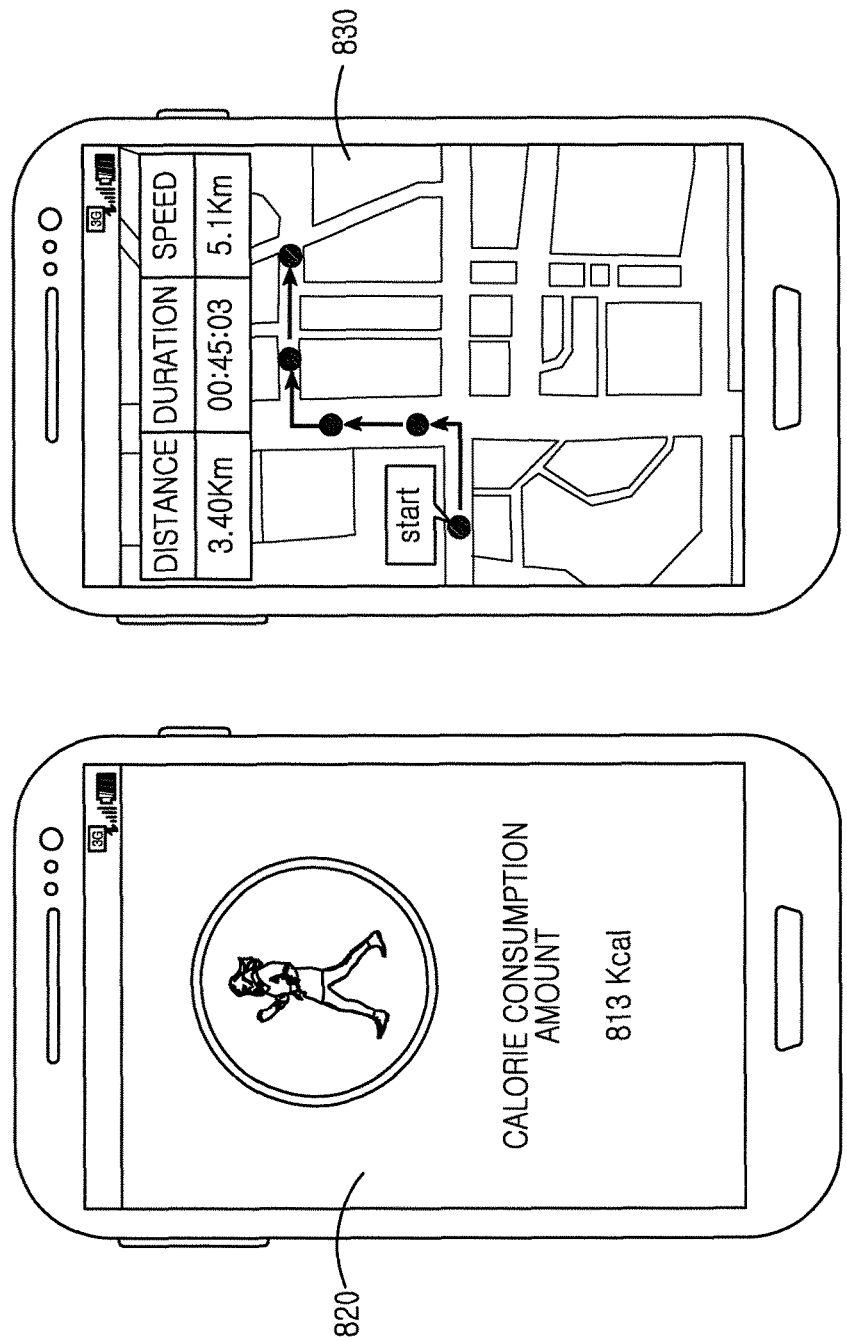

FIGS. 8A-8B illustrate an operation of a pocket mode according to various embodiments of the present disclosure.

Referring to FIG. 8, the electronic device may determine a pocket reception state in response to at least one of a touch input state and circumstance information.

When determining the pocket reception state, the electronic device may operate in a pocket mode that allows it to perform a function defined in advance, corresponding to the pocket reception state. For example, the electronic device that operates in the pocket mode may activate a function optimized under the pocket reception state as illustrated in FIG. 8A. According to an embodiment, when the electronic device operates in the pocket mode, since a circumstance where a user cannot recognize a bell sound under a pocket reception state may occur, the electronic device may activate a vibration mode or a Bluetooth mode instead of a bell sound mode.

When operating in the pocket mode, the electronic device may activate a healthy mode that may measure a user's movement. For example, the electronic device may calculate a user's step count, a movement distance, or consumed calorie depending on a movement distance, and the like, and activate a function of tracing the user's movement path. After operating in the pocket mode, when movement of the electronic device is recognized within a time defined in advance, for example, when movement is detected by a user's walking, running, and the like, the electronic device may allow the functions to be executed. According to an embodiment, after operating in the pocket mode, and when recognizing movement of moving on foot as illustrated in FIG. 8B, the electronic device may activate (820) a function of calculating consumed calorie depending on movement. The above function may provide a current moving state, for example, information informing sidewalk movement and a calorie consumption amount by sidewalk movement together.

The electronic device may perform an operation of a pocket mode based on a moving means. According to an embodiment, when determining that the electronic device moves using a moving means such as an automobile, a bicycle, and the like at a point of determining an operation condition of the pocket mode, the electronic device may allow to execute only a function matching the moving means. For example, even when the electronic device has been set to execute a passometer function in the pocket mode, the electronic device may activate a function of tracing a movement distance or a movement path instead of the passometer function. According to an embodiment, when after operating in the pocket mode, determining that it moves using a moving means as illustrated in FIG. 8B, the electronic device may activate (830) a path trace function that records a movement distance. The above function may cooperate with a map application, and record a movement path from a departure position up to a current position, and provide information such as a total movement distance, a movement time, a movement velocity, and the like together.

Figure 9:
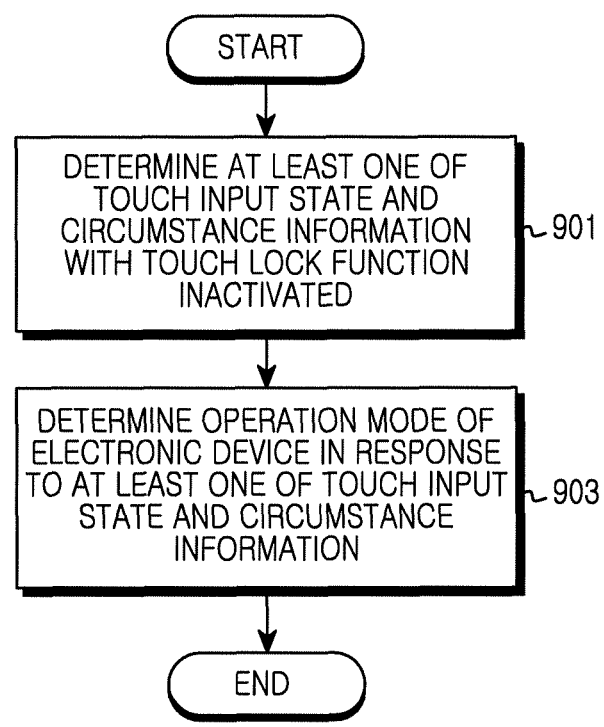
FIG. 9 illustrates a process for operating an electronic device according to an embodiment of the present disclosure.

FIG. 9 illustrates a process for operating an electronic device according to an embodiment of the present disclosure.

Referring to FIG. 9, the electronic device may perform an operation of determining at least one of a touch input state and circumstance information with a touch lock function inactivated in operation 901.

The electronic device may perform an operation of determining an operation mode of the electronic device in response to at least one of the touch input state and the circumstance information in operation 903.

The operation may include an operation of determining a pocket reception state based on at least one of the touch input state and the circumstance information.

An operation of determining the touch input state may include an operation of determining at least one of an indirect touch input for a touchscreen, a touch area, and a touch movement direction.

The indirect touch input may include an input detected by a pocket contacting a human body.

The indirect touch input may include at least one of a glove touch, a cover touch, and a proximity touch.

An operation of determining the circumstance information may include an operation of determining at least one of neighboring noise and illuminance.

An operation of determining an operation mode of the electronic device may include an operation of determining at least one mode among a mode for inactivating at least one of functions of the electronic device under a pocket reception state, a mode for adjusting transmission power to reduce SAR, a mode for activating a function that may measure a user's movement, and a communication method change mode.

According to various embodiments, a computer-readable recording medium may record a program for executing an operation of determining a pocket reception state based on a touch movement direction and a movement direction of the electronic device, and an operation corresponding to the pocket reception state.

According to various embodiments, a computer-readable recording medium may record a program for determining sensitivity for an input generated by a pocket contacting a human body.

According to various embodiments, a computer-readable recording medium may record a program for controlling at least one of functions of the electronic device under a pocket reception state.

According to various embodiments, an electronic device may operate in a pocket mode under a pocket reception state to prevent unnecessary power consumption and abnormal input from occurring, and perform an operation related to the pocket mode to improve convenience for the electronic device.

Although the disclosure has been shown and described with reference to certain embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. An electronic device comprising:
a touchscreen and a processor,
wherein the processor is configured to:
    detect a touch input on the touchscreen,
    while detecting the touch input, identify whether an area in which the touch input is detected is larger than a designated area and identify whether a first direction in which the area moves is different from a second direction in which the electronic device moves,
    based on identifying that the area is larger than the designated area and the first direction is different from the second direction, determine that the electronic device is inserted into a pocket,
    in response to the determination, deactivate the touchscreen and adjust transmission power to reduce a specific absorption rate (SAR), and
    in response to the determination, perform at least one of restricting a bell sound, providing a haptic effect, or activating a bluetooth communication, based on receiving a call.

2. The electronic device of claim 1, the processor is further configured to:
based on identifying that a sensitivity of the touch input detected in the area larger than the designated area is within a range of a designated sensitivity, determine that the electronic device is inserted into the pocket.

3. The electronic device of claim 2, wherein the designated sensitivity corresponds to a sensitivity of an input caused by other than a human body and an electronic pen.

4. The electronic device of claim 1, wherein the processor is further configured to:
in response to determining that the electronic device is inserted into the pocket, activate a function capable of measuring a movement of the electronic device.

5. The electronic device of claim 1, wherein the processor is further configured to:
in response to determining that the electronic device is inserted into the pocket, activate a map application and track a movement path of the electronic device through the map application.

6. The electronic device of claim 1, further comprising a sensor capable of detecting at least one of a brightness around the electronic device and a noise around the electronic device,
wherein the processor is configured to:
detect at least one of the brightness and the noise using the sensor, and based on at least one of the detected brightness and the detected noise, determine that the electronic device is inserted into the pocket.

7. The electronic device of claim 1, wherein the processor is configured to:
based on identifying that the first direction is opposite to the second direction, determine that the electronic device is inserted into the pocket.

8. A method for operating an electronic device, the method comprising:
detecting a touch input on a touchscreen of the electronic device;
while detecting the touch input, identifying whether an area in which the touch input is detected is larger than a designated area and identifying whether a first direction in which the area moves is different from a second direction in which the electronic device moves;
based on identifying that the area is larger than the designated area and the first direction is different from the second direction, determining that the electronic device is inserted into a pocket;
in response to the determination, deactivating the touchscreen and adjusting transmission power to reduce a specific absorption rate (SAR); and
in response to the determination, performing at least one of restricting a bell sound, providing a haptic effect, or activating a bluetooth communication, based on receiving a call.

9. The method of claim 8, wherein the determination that the electronic device is inserted into the pocket comprises, based on identifying that a sensitivity of the touch input detected in the area larger than the designated area is within a range of a designated sensitivity, determining that the electronic device is inserted into the pocket.

10. The method of claim 9, wherein the designated sensitivity corresponds to a sensitivity of an input caused by other than a human body and an electronic pen.

11. The method of claim 8, further comprising, in response to determining that the electronic device is inserted into the pocket, activating a function capable of measuring a movement of the electronic device.

12. The method of claim 8, further comprising:
detecting at least one of a brightness around the electronic device and a noise around the electronic device; and
based on at least one of the brightness and the noise, determining that the electronic device is inserted into the pocket.

13. The method of claim 8, wherein the determination that the electronic device is inserted into the pocket comprises, based on identifying that the first direction is opposite to the second direction, determining that the electronic device is inserted into the pocket.

14. A non-transitory computer-readable recording medium storing one or more programs that when executed by at least one processor of an electronic device cause the at least one processor to perform a process comprising the operations of:
detecting a touch input on a touchscreen of the electronic device;
while detecting the touch input, identifying whether an area in which the touch input is detected is larger than a designated area and identifying whether a first direction in which the area moves is different from a second direction in which the electronic device moves;
based on identifying that the area is larger than the designated area and the first direction is different from the second direction, determining that the electronic device is inserted into a pocket;
in response to the determination, deactivating the touchscreen and adjusting transmission power to reduce a specific absorption rate (SAR); and
in response to the determination, performing at least one of restricting a bell sound, providing a haptic effect, or activating a bluetooth communication, based on receiving a call.

15. The non-transitory computer-readable recording medium of claim 14, wherein the determination that the electronic device is inserted into the pocket comprises, based on identifying that a sensitivity of the touch input detected in the area larger than the designated area is within a range of a designated sensitivity, determining that the electronic device is inserted into the pocket.

16. The non-transitory computer-readable recording medium of claim 14, wherein the process further comprises:
in response to determining that the electronic device is inserted into the pocket, activating a function capable of measuring a movement of the electronic device.

17. The non-transitory computer-readable recording medium of claim 14, wherein the determination that the electronic device is inserted into the pocket comprises, based on identifying that the first direction is opposite to the second direction, determining that the electronic device is inserted into the pocket.

* * * * *